UNITED STATES PATENT OFFICE.

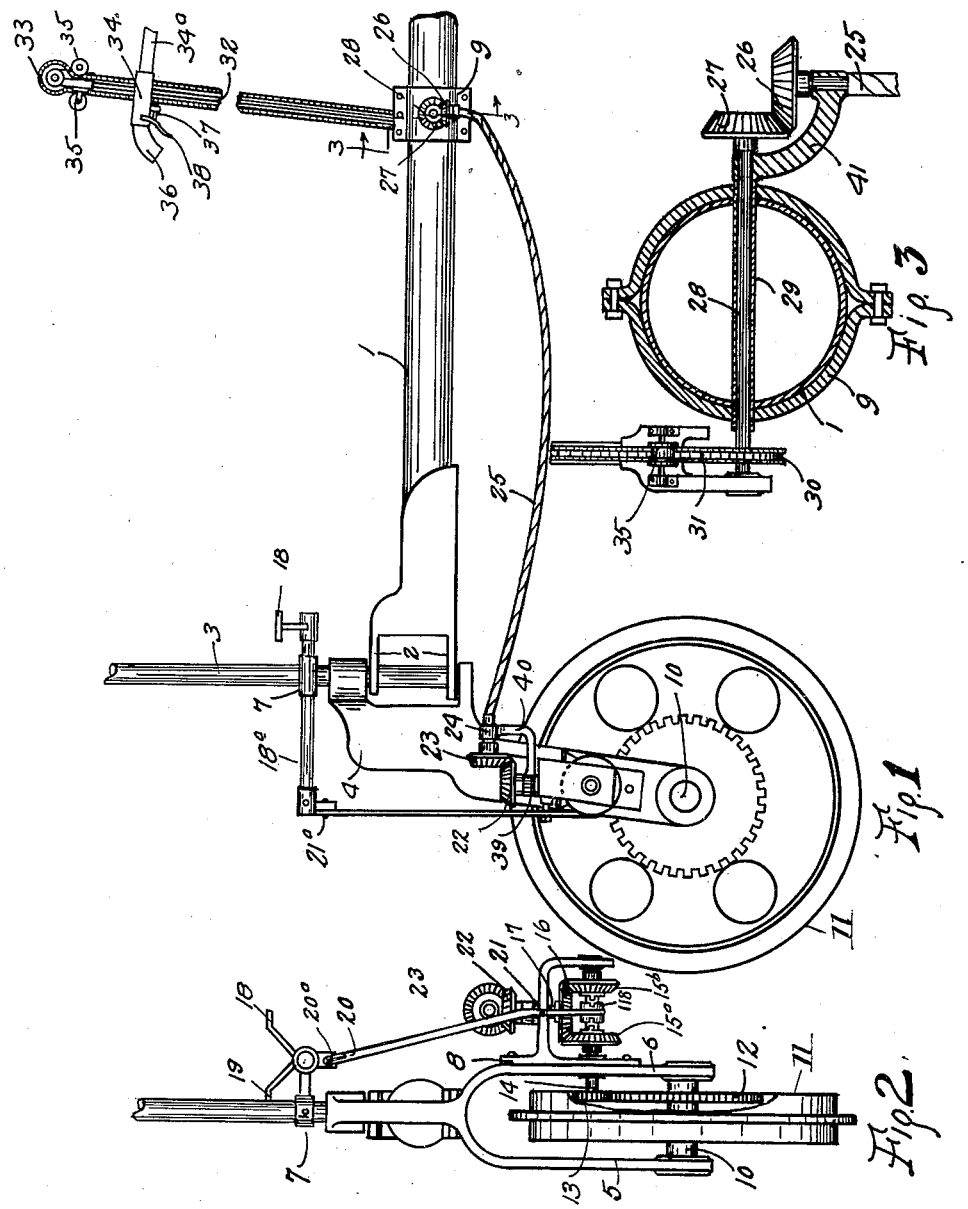

GEORGE FREDRICK HORCH, OF RITZVILLE, WASHINGTON.

HEADER.

1,096,303.  Specification of Letters Patent.  Patented May 12, 1914.

Application filed April 23, 1913. Serial No. 763,133.

*To all whom it may concern:*

Be it known that I, GEORGE FREDRICK HORCH, a subject of the Czar of Russia, residing at Ritzville, in the county of Adams and State of Washington, United States of America, have invented new and useful Improvements in Headers, of which the following is a specification.

My invention relates to an improved header and has as its principal object the provision of means whereby the header may be raised or lowered by power actuated means.

A further object resides in the particular arrangement and combination of parts hereinafter described.

In the accompanying drawing:—Figure 1 is a side elevation of the steering wheel and a portion of the frame of a machine for heading grain having my improvement. Fig. 2 is a front view of the machine shown in Fig. 1, parts being broken away. Fig. 3 is a detail sectional view taken on the line 3—3 of Fig. 1 in the direction of the arrow.

In the separate views the same part is designated by the same reference character.

Referring more particularly to the drawing, 1 is a portion of the frame of a header which is shown as tubular in form in accordance with common practice. At the forward end of the part 1 are two flanges such as 2 in which is pivoted the steering post or pillar 3 of the header. Rigid with the pillar 3 is a frame 4 provided with two forks 5 and 6 in which are journaled the shaft 10 of the steering wheel 11. Moreover, I provide a bracket 7 which is fast on the pillar 3, the purpose of which will hereinafter appear. Carried on the shaft 10 is a gear wheel 12 which meshes with a pinion 13 carried on a shaft 14 which is journaled in the fork 6. On the outside of the fork 6 is fastened a bracket 8 in which is journaled the outer end of the shaft 14, and two beveled gears 15ᵃ and 15ᵇ are loosely mounted on the shaft 14 between the fork 6 and the outer end of the bracket. As clearly shown in Fig. 2, gears 15ᵃ and 15ᵇ face each other, and intermediate thereof on the shaft 14 is a clutch 118 which is keyed to the shaft 14 but adapted to slide longitudinally thereof, the wheels 15ᵃ and 15ᵇ each being provided with projections which are adapted to be engaged by the clutch 118 when it is desired that one or the other of the gears shall be rotated. Also journaled in the bracket 8 is a short vertical shaft 17 at the lower end of which is carried a beveled gear 16 which meshes with both of the gears 15ᵃ and 15ᵇ. It will be apparent that the gear 16 will be turned in one direction or the opposite depending on whether gear 15ᵃ or 15ᵇ is clutched to the shaft 14. In order to drive 16 in whichever direction it is desired, I provide a lever 20 which is loosely but operatively engaged with the clutch 118 and which is pivoted to the bracket 8 at the point 21. At the upper end the lever 20 is provided with a slot 20ᵃ in which is a pin 21ᵃ carried by short lever arm at the end of a shaft 18ᵃ which is journaled in the bracket 7 previously mentioned. At the end of the shaft 18ᵃ opposite the pin 21ᵃ are two foot pedals 18 and 19, respectively, by which shaft 18ᵃ may be tilted in either direction and by means of which, through the connections just described, the clutch 118 may be operated to engage either of the gears 15ᵃ or 15ᵇ as is desired.

At the upper end of the shaft 17 is a beveled gear 22 which meshes with a second beveled gear 23 journaled at 24 in the right angle bracket 40 which is loose on the shaft 17 as indicated at the point 39. The pinion or gear 23 connects with and drives a flexible member 25 which is connected at its other end with a beveled gear 26 which meshes in turn with a gear 27 rigid with the shaft 28. The shaft 28 is journaled in the pipe 29 which extends through the member 1 and sleeve 9 which is clamped around the member 1 at this point. Shaft 28 also carries at the end opposite the wheel 27 a sprocket wheel 30 over which the chain 31 passes. Chain 31 follows a Jacob's staff 32 as shown in Fig. 1, there being a sprocket wheel 33 at the top of said shaft over which the chain passes, and intermediate the sprockets 30 and 33, the chain 31 passes through a suitable opening in the handle extension 34 which I have provided on the usual tilting lever 34ᵃ, it being understood that it is common practice to provide heading machines with tilting levers whereby the heading mechanism may be raised and lowered. On the extension 34 I provide also a handle or grip 36 which is provided with a latch 37 which is adapted to be operated by the trigger 38, the latch 37 being adapted to fit into the links of the chain 31 whereby the lever 34ᵃ may be raised or lowered. It will be seen from Figs. 1 and 3 that I have provided idlers 35 whereby the chain 31 is held in correct position and properly guided through the opening in the extension 34. From the foregoing it will be seen that whenever clutch 118 is thrown into engagement with 15ª or 15ᵇ, the chain 31 will be carried clockwise or counterclockwise, as the case may be, thus carrying lever 34ª up or down and tilting the header.

As previously mentioned, the hub 39 of the bracket 40 is loose on the shaft 17 thus allowing the bracket as a whole to swing from left to right so that in case wheel 11 is swung in steering, the bracket may accommodate itself to the new position of the wheel and thus avoid placing the strain on the flexible shaft or member 25. A similar arrangement is provided at the opposite end of the flexible shaft 25 from the bracket 40 where the gear 26 is journaled in the bracket 41 which is rigid with the sleeve 29 which latter can turn in the member 1 so as to allow bracket 41 and wheel 26 to turn in any desired position to relieve the strain on the member 25.

From the foregoing it will be obvious that I have provided an arrangement by which the operator of a header may tilt the heading mechanism by power, and also one in which the driver is able to handle his horses, tilt his heading mechanism and steer the machine at one time with perfect ease. In case the operator wishes to tilt the frame by hand, when the machine is standing still, latch 37 is withdrawn by means of trigger 38 and the lever 34ª is operated manually.

It will be understood that while I have shown and described the preferred form of my invention, various modifications and rearrangements thereof may be made without departing from the spirit of my invention, and that parts thereof may be used without utilizing the whole.

Having thus described my invention, what I claim is:—

1. In a heading machine in combination, a frame, a steering frame pivoted to said first mentioned frame, a steering wheel journaled in said steering frame, a shaft supported from said steering frame, a gear rigid with said shaft, means for driving said shaft from said steering wheel, a bracket journaled on said shaft, a second gear journaled in said bracket and meshing with said first mentioned gear, a flexible member attached to said second gear, and means driven by said flexible member whereby the heading mechanism may be tilted.

2. In a heading machine in combination, a frame, a bracket pivoted in said frame, a shaft co-axial with said bracket carrying a gear thereon, a second gear journaled in said bracket meshing with said first mentioned gear, a flexible shaft connected with said first mentioned gear, means for driving said shaft in either direction as desired, a lever for tilting the heading mechanism, and means driven by said first mentioned shaft for moving said lever up or down as desired.

3. In a heading machine in combination, a frame, a pillar post pivoted to said frame, forks rigid with said pillar, a steering wheel journaled in said forks, a bracket attached to said pillar post, a shaft journaled in said bracket, a bracket carried by one of said forks, a lever pivoted to said second mentioned bracket having operative connection with said shaft, a shaft journaled in said fork having two beveled gears loosely mounted thereon, a support for fastening either of said gears to said second mentioned shaft having operative engagement with said lever, a bracket mounted on said fork, a third shaft journaled in said bracket having a beveled gear meshing with both of said loose gears and having a beveled gear at its opposite end, a bracket journaled on said last mentioned shaft, a gear journaled in said bracket meshing with said last mentioned gear, means driven by said last mentioned gear for tilting the heading mechanism, and means whereby said first mentioned shaft may be rocked in either direction.

In testimony whereof I affix my signature in the presence of two witnesses.

GEORGE FREDRICK HORCH.

Witnesses:
J. OSCAR ADAMS,
LOLA WALSER.

---

Copies of this patent may be obtained for five cents each, by addressing the "Commissioner of Patents, Washington, D. C."